(No Model.) 2 Sheets—Sheet 1.
C. E. PERKINS.
MECHANISM FOR OPERATING CHURNING APPARATUS.

No. 564,158. Patented July 14, 1896.

Witnesses:
J. R. Garfield
K. S. Clemons

Inventor
Clarence E. Perkins,
by Chapin
Attorneys.

(No Model.) 2 Sheets—Sheet 2.

C. E. PERKINS.
MECHANISM FOR OPERATING CHURNING APPARATUS.

No. 564,158. Patented July 14, 1896.

Witnesses:
J. W. Garfield
K. J. Clemons

Inventor
Clarence E. Perkins,
by
Attorneys.

United States Patent Office.

CLARENCE E. PERKINS, OF WESTFIELD, MASSACHUSETTS, ASSIGNOR OF TWO-THIRDS TO GEORGE H. SHARP AND THOMAS DYSON, OF SAME PLACE.

MECHANISM FOR OPERATING CHURNING APPARATUS.

SPECIFICATION forming part of Letters Patent No. 564,158, dated July 14, 1896.

Application filed February 17, 1896. Serial No. 579,500. (No model.)

*To all whom it may concern:*

Be it known that I, CLARENCE E. PERKINS, a citizen of the United States, residing at Westfield, in the county of Hampden and State of Massachusetts, have invented new and useful Improvements in Mechanism for Operating Churning Apparatus, of which the following is a specification.

This invention relates to mechanism for imparting a reciprocally-rotating movement to a shaft, with which may be connected a churn or other similar apparatus, the object being to provide an improved mechanism or mechanical movement whereby said reciprocally-rotating movement is induced by a continuous rotary movement of the driving-shaft in one direction; and the invention consists in the peculiar construction and arrangement of the several parts of the devices, all as hereinafter fully described, and more particularly pointed out in the claims.

Figure 1:
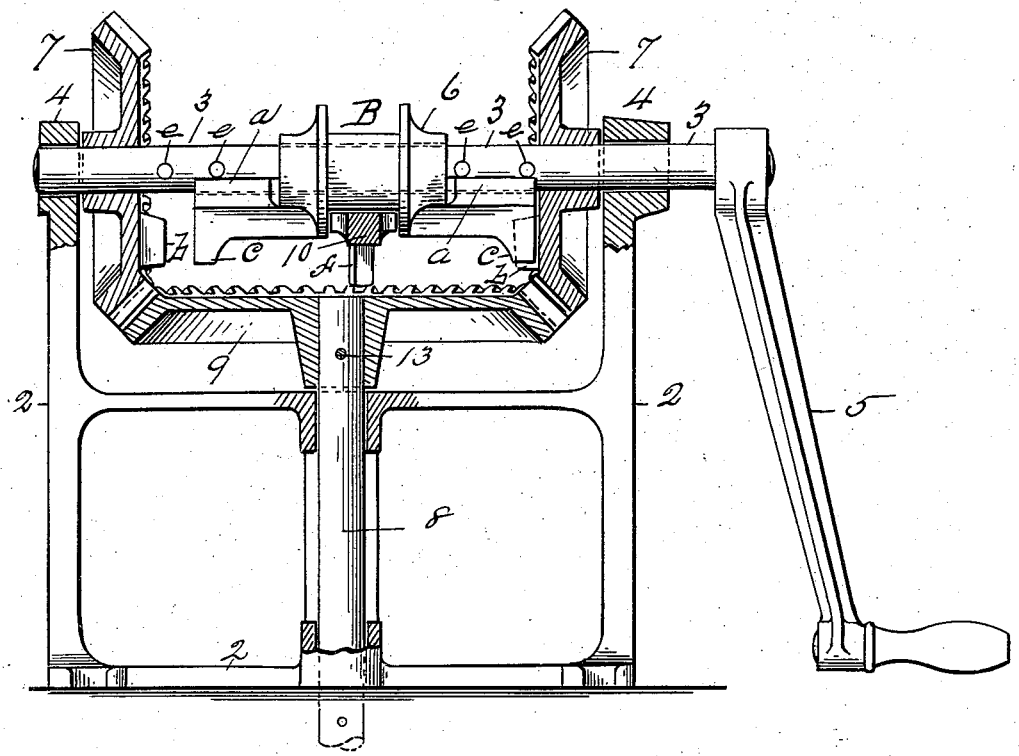
Figure 2:
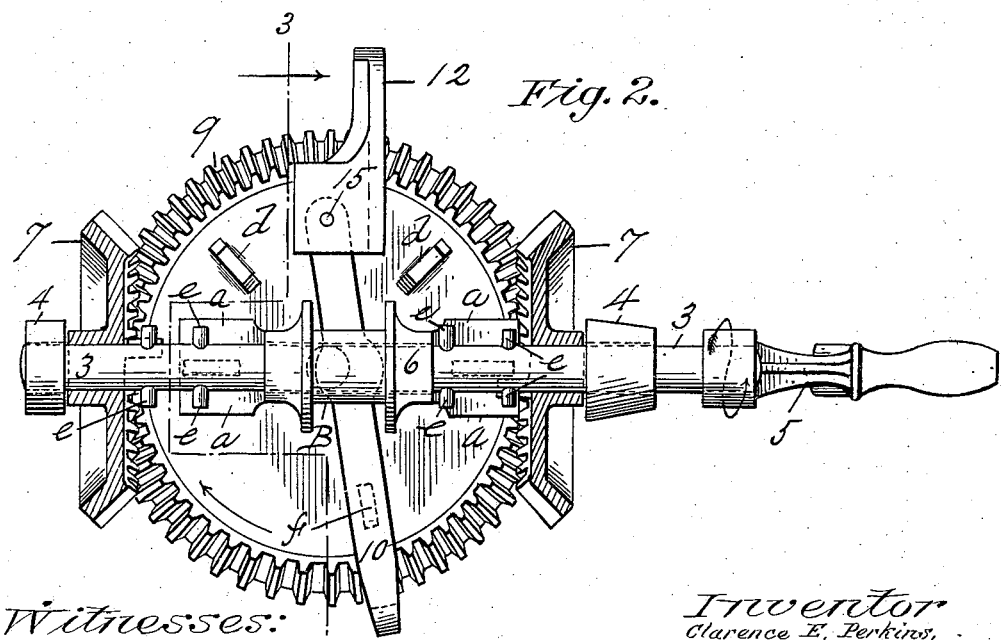
Figure 3:
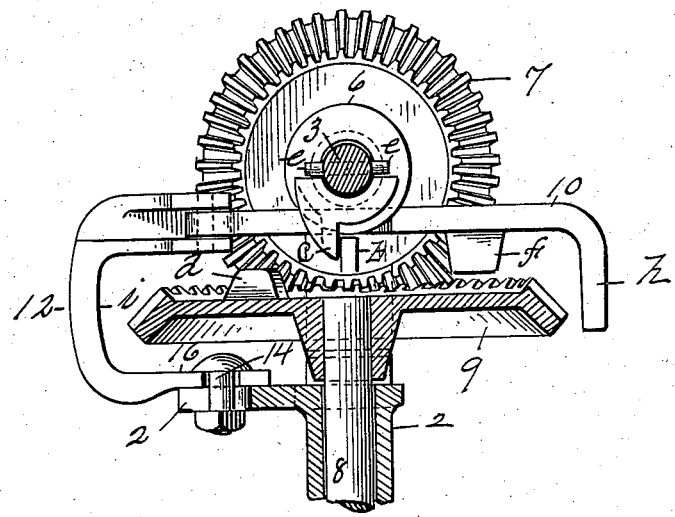
Figure 4:
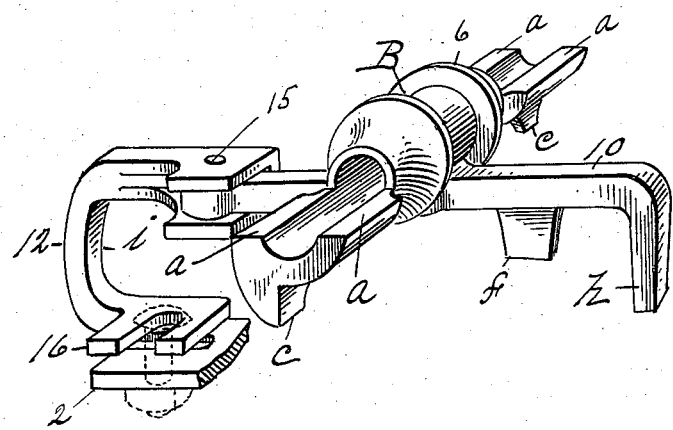

In the drawings forming part of this specification, Figure 1 is a front elevation, partly in section, illustrating the construction embodying my improvements. Fig. 2 is a plan view, partly in section. Fig. 3 is a sectional view on line 3 3, Fig. 2. Fig. 4 is a perspective view of detail parts hereinafter fully described.

In the drawings, 2 indicates the frame of the machine.

3 is the driving-shaft of the machine, adapted to rotate in the bearings 4 in said frame, and to be actuated in any convenient manner, or by a crank 5. A clutch 6 is adapted to slide longitudinally on shaft 3, and to be given a rotary motion coincident with that of said shaft, by means of a series of clutch-pins $e$, fixed in and projecting from the surface of said shaft, as shown. The said clutch 6 is provided with an annular groove B, centrally between its ends, and extending in opposite directions from said annular groove are clutch-pin bearing-faces $a$ on said clutch, with which faces the said clucth-pins $e$ in shaft 3 engage. Thus the clutch 6 may have a free sliding movement on shaft 3, but is subject to the rotary movement of said shaft.

On the under side of and at each end of the clutch 6 is a clutch projection $c$ for engagement, alternately, with one of the gears 7 7, which gears are hung loosely on shaft 3. The clutch projections $b\,b$ on the faces of said gears 7, adjoining the ends of said clutch 6, provide means for the engagement of said clutch with said gears, as aforesaid. A gear 9, which is engaged by said gears 7 7, is connected to the upper end of shaft 8, which is supported in suitable bearings in the frame 2 of the machine, and has the clutch projections $d\,d$ on its face, adjoining the clutch-lever 10. It being desirable that said shaft 8 be removable from the gear 9 for the attachment thereto of different devices that are to be operated by the machine herein described, the shaft 8 and gear 9 are secured one to the other by a pin 13 or other suitable means, (see Fig. 1,) which may be removed therefrom for said operations, in connection with the shaft 8. Thus the gear 9, when disconnected from shaft 8, is left in the position shown in Fig. 2, wherein the said two projections $d\,d$ thereon are shown in proper operative relations to the pivoted clutch-lever 10. The proper reciprocating movement of the gear 9, whereby said projections $d\,d$ thereon shall alternately act upon said lever 10, and through the latter upon said clutch 6, whereby the latter shall alternately engage with said gears 7 7, requires care at the outset, and hence it is desirable that care be taken to keep the three gears 7, 7, and 9 in mesh or engagement when shaft 8 shall be disconnected from the gear 9, as aforesaid. To that end the said clutch-lever 10 is provided with the depending arm $h$, which is opposite the border of said gear at one side of the machine, and at the opposite side of the latter is the curved support 12, to which said clutch-lever is pivoted. The inner face $i$ of said support 12 and the opposite inner side of said arm $h$ constitute guards against the movement laterally of said gear 9 from its operative position between the gears 7 7, and thus the displacement of gear 9, above referred to, when said shaft 8 shall be disconnected therefrom, is presented. The lever 10 extends over gear 9 and is provided with a clutch projection $f$ on its under side for alternate engagement with said projections $d\,d$ on said gear, whereby said lever 10 is vibrated and clutch 6 is engaged alternately with each of said gears 7 7. The said lever-support 12, to which one end of said clutch-lever 10 is pivoted at 15, is bolted adjustably to a lateral extension of frame 2 by a bolt 14, Fig. 3. For said adjustment the part of the frame 2 to which said support is bolted is slotted, as shown in Fig. 4, and the foot 16 of said support is likewise slotted, but transversely of the slot in said frame part, to the end that said support may be moved in different directions, as may be demanded by the necessity of bringing the pivoted end of said lever 10 to a proper operative position over part of said gear 9.

The operation of the above-described devices is as follows, understanding that the several parts of the machine occupy the positions shown in Fig. 2: If, now, the crank 5 be turned in the direction indicated by the arrow on the hub of said crank, the clutch 6 will be rotated in like direction, and will carry with it the adjoining loose gear 7 at the right in said figure. Said movement of gear 7 will cause the rotation of the gear 9 and its connected shaft 8 in the direction indicated by the arrow on the face of said last-named gear, and the consequent movement of the projection $d$, at the right of lever 10 in that figure, around under shaft 3 and against the clutch projection $f$ on lever 10, thereby causing said lever to swing in the direction of said arrow and to slide clutch 6 out of engagement with said first-named gear 7, and into engagement with the opposite gear 7, and to rotate the latter in a direction opposite to the first-named one, thereby causing movements in the gear 9 and in the clutch-lever 10 opposite to those just described. Thus by the continual rotation of the shaft 3 the clutch 6 and lever 10 and the gear 9 are caused to have the movements described, whereby the shaft 8, connected with said gear 9, is made to rotate reciprocally.

Having thus described my invention, what I claim, and desire to secure by Letters Patent, is—

1. In an apparatus for imparting a reciprocally-rotating movement to churning or analogous devices, a suitably-supported driving-shaft, two beveled gears supported loosely face to face on said shaft, and each having a clutch projection on its inner face, a vertical shaft suitably supported in the frame of the machine, a beveled gear 9, secured on said vertical shaft and engaging with said two first-named beveled gears having two clutch-lever projections $d$, $d$, on its face adjoining said driving-shaft, a clutch on said driving-shaft having a portion of each of its ends cut away and provided with projections $c$; and having a longitudinally-sliding movement on said shaft for alternate engagement with said two beveled gears, projections on said shaft for engaging said clutch whereby the latter is caused to rotate with said shaft, combined with a clutch-lever support attached to the frame of the machine, a vibratory lever pivoted to said support and extending over said gear, and engaging with said clutch, and a clutch projection on said lever for engagement, alternately, with each of said two projections on said gear 9, substantially as set forth.

2. In an apparatus for imparting a reciprocally-rotating movement to churning or analogous devices, a suitably-supported driving-shaft, two beveled gears 7, 7, supported loosely face to face on said shaft, and each having a clutch projection on its inner face, a clutch 6, having a sliding movement on said driving-shaft for engagement alternately with the projections on said gears 7, 7, and having a portion of each of its ends cut away, projections on said shaft for engaging said clutch whereby the latter rotates in consonance with said shaft, combined with a vibratory clutch-lever 10, extending under said shaft and engaging with said clutch, a clutch projection $f$, on said lever, a shaft 8, supported vertically to the axis of said driving-shaft, a gear 9, secured to said shaft 8, and engaging with said two gears 7, 7, having projections thereon for alternate engagement with said clutch-lever, whereby the latter is given a vibratory motion, and said clutch is alternately engaged with each of said gears 7, and a reciprocating rotary motion is imparted to said gear 9, and shaft 8, substantially as set forth.

3. In combination, the gear 9, and the gears 7, 7, supported in engagement therewith, of the curved lever-support 12, the lever 10, extending over said gear 9, having the depending arm $h$, extending across the border of said gear 9, and pivotally connected to said support and the clutch, substantially as set forth.

CLARENCE E. PERKINS.

Witnesses:
H. A. CHAPIN,
K. I. CLEMONS.